United States Patent [19]

Izumi et al.

[11] Patent Number: 4,586,378

[45] Date of Patent: May 6, 1986

[54] UNKNOWN SOUND EVALUATING METHOD AND APPARATUS

[75] Inventors: Shigeru Izumi, Hitachi; Yoshihiro Michiguchi; Makoto Senoh, both of Ibaraki, all of Japan

[73] Assignee: Hitachi, Ltd., Tokyo, Japan

[21] Appl. No.: 658,167

[22] Filed: Oct. 5, 1984

[30] Foreign Application Priority Data

Oct. 7, 1983 [JP] Japan ............................ 58-187028
Jan. 11, 1984 [JP] Japan .............................. 59-1987

[51] Int. Cl.⁴ .................................................. G01N 29/04
[52] U.S. Cl. ...................................... 73/572; 367/129
[58] Field of Search ................... 73/572, 587, 622; 367/129; 364/517

[56] References Cited

U.S. PATENT DOCUMENTS

| 4,009,463 | 2/1977 | Vercellotti et al. | 367/129 |
| 4,352,167 | 9/1982 | Hashimoto et al. | 367/127 |
| 4,459,851 | 7/1984 | Crostack | 73/587 |

*Primary Examiner*—Anthony V. Ciarlante
*Attorney, Agent, or Firm*—Antonelli, Terry & Wands

[57] ABSTRACT

Method and apparatus for evaluating location of an unknown sound generated in a structure such as a pressure vessel. A plurality of sound detectors are mounted on the structure for detecting sounds generated in the structure. On the basis of sound information of the unknown sound source derived from the outputs of the detectors, the location where the unknown sound is produced is determined. To this end, reference sounds are first generated at a plurality of known reference sound source positions, wherein information of the reference sounds derived from the outputs of the detectors are stored in a storage unit. Equi-pattern-distance curves each of which is in an equal pattern distance between a supposed unknown sound source and each of the reference sound sources are calculated on the basis of the reference sound information. The equi-pattern-distance curves are further corrected in accordance with the reference sound information. Upon occurrence of an unknown sound, pattern distances between the desired reference sound source positions and the unknown sound source position are calculated through pattern recognition procedure from the sound information derived from the outputs of the detector and the reference sound information stored. On the basis of the calculated pattern distances and the equi-pattern-distance curves, the position of the unknown sound source is determined. On the basis of the position of the unknown sound source, kinetic energy thereof may be arithmetically determined.

9 Claims, 12 Drawing Figures

UNKNOWN SOUND EVALUATING METHOD AND APPARATUS

The present invention generally relates to a method of evaluating a position of a sound source in a structure. More particularly, the invention concerns a method and apparatus suited for detecting position and additionally kinetic energy of a foreign material or part in a structure by evaluating a location where impulsive tone or sound produced upon collison of the foreign material or part against the structure.

The present invention is related to a copending U.S. patent application Ser. No. 617,500 filed June 5, 1984 assigned to the same assignee.

As proposed, for example, in U.S. Pat. No. 4,352,167, for evaluating or determining the location of a sound source within a structure such as a pressure vessel for a nuclear reactor, it has been found very effective that the peak value data and/or arrival time difference data of sound signals produced by a number of known sound sources located at known positions are stored as a file or data library in a memory of a computer, wherein upon detection of a sound from an unknown source, the data which are similar to those derived from the analyses of the detected sound originating in the unknown source are retrieved from the memory to thereby determine the distances from a number of the known sound sources to the unknown sound source on the basis of the extent or degree of similarity between the data of the unknown sound source and those of the known sound sources (this degree of similarity is referred to as the pattern distance). This evaluating method has been found very advantageous for the evaluation of the unknown sound source particularly when a structure of a complicated inner configuration such as a pressure vessel for a nuclear rector is in concern.

However, the method described above is still accompanied with a problem that error is involved in transformation of the pattern distances between an unknown sound source and the known sound sources into real distances between these sound sources. This error tends to be more significant, as the configuration of the structure in concern becomes more complicated. To solve this problem, it may be conceived that the number of the known sound sources (reference sound sources) on the structure be increased as large as possible. However, in actual applications, provision of an increased number of the reference sound sources on the pressure vessel means that a tremendous job is required. Particularly in the case of the nuclear reactor where data of the reference sound sources have to be collected by striking the pressure vessel with a hammer or the like means at locations which are difficult to be accessed due to the restricted space, it is desirable that the number of the reference sound sources be as small as possible.

Accordingly, it is a primary object of the present invention to provide a method of evaluating the location or position and/or kinetic energy of a foreign body or loose part in a structure, which method allows error involved in the theoritical calculation to be reduced by utilizing effectively pattern distances between an unknown sound source and reference sound sources, while decreasing the number of reference sound sources.

Another object of the present invention is to provide an apparatus for carrying out the above method.

The present invention is summarized as follows: At least three sound detectors for detecting impulsive sound generated at a given location of a structure to be monitored are installed at appropriate locations associated with the structure, and at least three appropriate locations on the structure are selected for providing reference sound sources and struck with a hammer or the like means to generate the reference sounds, wherein data of the peak values of the detection signals produced by the detectors in response to the reference sounds as well as data of difference in time required for the reference sounds to reach the respective detectors (referred to as the signal arrival time difference) are previously stored in the form of data file in a memory of a computer. The structure is divided into regions or points in a mesh-like array (hereinafter referred to as the mesh points). On the assumption that an unknown sound source is present at each of the mesh points, the pattern distances between the unknown sound sources located at the mesh points and the reference sound source positions are theoritically calculated on the basis of the sound data and stored in a memory of the computer. Upon actual detection of an unknown sound source, the sound signal originating in the unknown sound source and produced by the detectors is fetched. At least one of data of the peak value and the signal arrival time difference of the that sound signal is utilized for calculating the pattern distances between said one data and the corresponding reference sound source data. Subsequently, the mesh point having the pattern distance which coincides with the calculated pattern distance is retrieved from the data file stored in the memory, and it is presumed that the unknown sound source is located at the retrieved mesh point. In that case, however, there are a number of mesh points which have the pattern distances coinciding with the calculated pattern distance. These mesh points are interconnected, whereby a curve is plotted. Another curve can be depicted for another reference sound source position. Then, it can be presumed that the unknown sound source is present at the intersection between these curves. By the way, it should be mentioned that errors or differences exist between the theoritically determined pattern distances and the pattern distances calculated on the basis of the real data of the impulsive sound, because the theoritically determined pattern distances represent nothing but approximations. Accordingly, in order to eliminate the error, the theoritically determined pattern distances have to be correspondingly corrected or modified. In the present invention, it is intended to execute the correction or modification of the theoritically determined pattern distance in a satisfactory manner, to thereby improve the evaluation accuracy, while decreasing the number of the reference sound source positions.

Other objects, features and advantages of the present invention will be more apparent from the following description when read in conjunction with the accompanying drawings, in which.

In the following, description will first be made on the positional or geometrical relationships between sound sources and the sound detectors on the basis of experimentally obtained data concerning the peak values of the detection signals produced in response to the impulsive sounds due to impacts on a structure, which will then be followed by the description of methods of measuring and evaluating the sound source position and the impulsive energy according to the invention.

Figure 1:
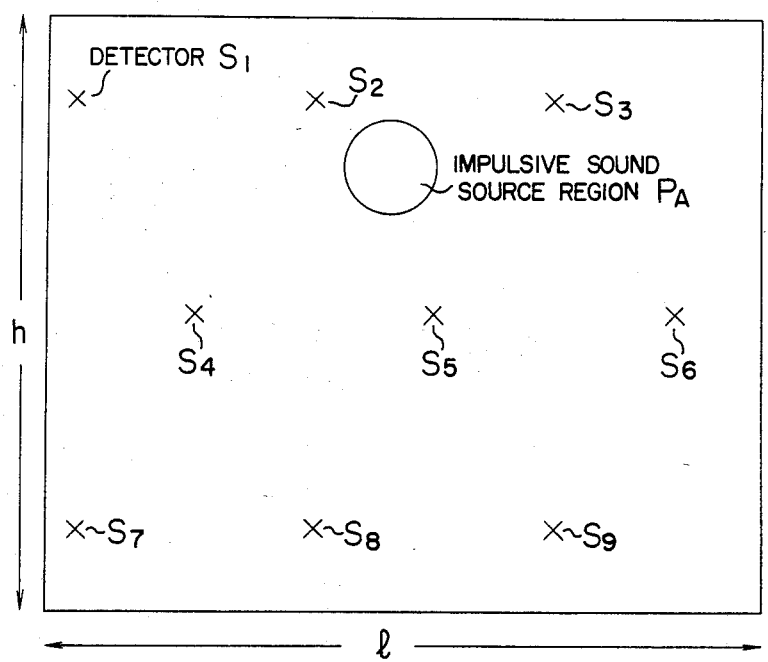
FIG. 1 is a developed view of a cylindrical vessel or tank used in the experiments which provide the basis to the concept of the present invention.

FIG. 1 shows in a developed view a side wall of a cylindrical tank or vessel which has been employed in the experiments for detection of impulsive sound. The cylindrical vessel is 5 m in height h, 2 m in diameter and ca. 6 m in the circumferential length l. Nine sound detectors $S_1$ to $S_9$ are mounted on the side wall of the cylindrical vessel in a substantially uniform distribution for detecting impulsive sound, as is shown in FIG. 1. An impact or shock for reference (also referred to as the reference impact) is applied to the side wall of the cylindrical vessel by means of a spherical rigid pendulum member at a plurality of locations, although only one of the locations is shown at $P_A$ in FIG. 1. Kinetic energy of the spherical rigid pendulum element upon impact for reference is selected to be constantly 21 mJ.

Figure 2:
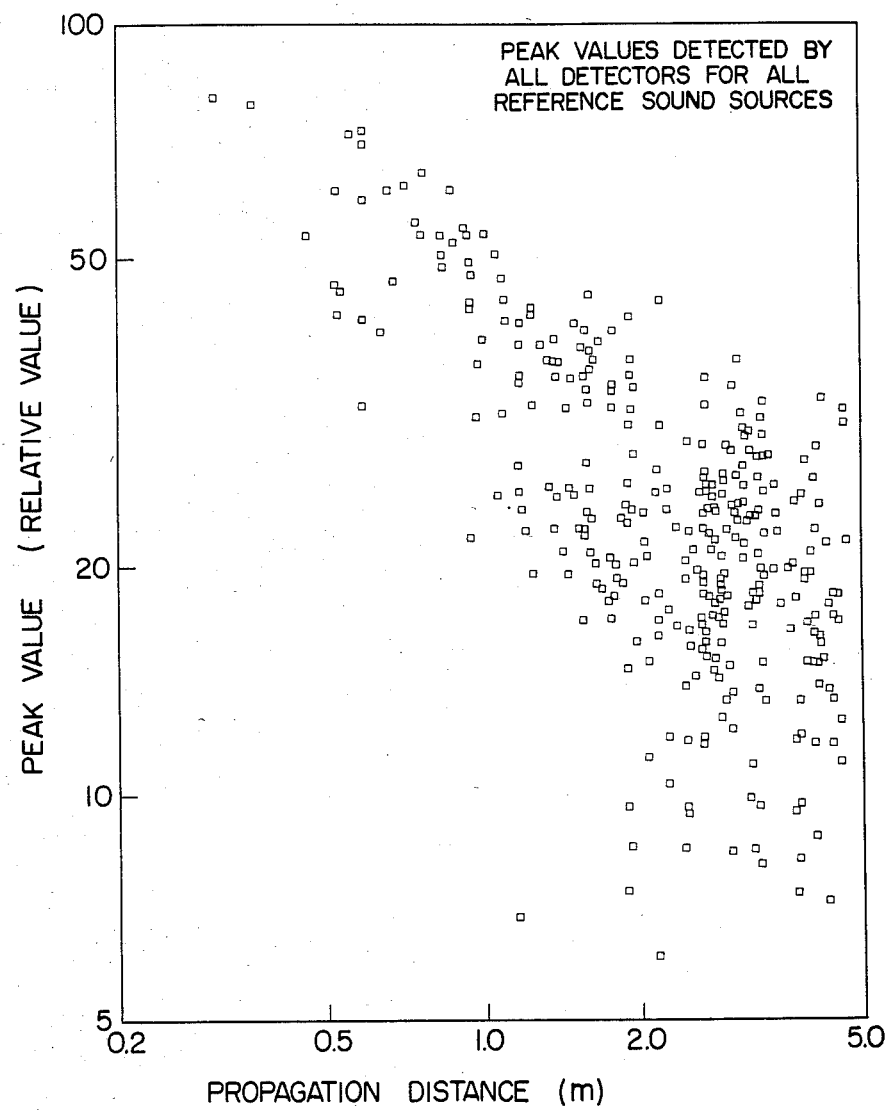
FIGS. 2, 3, 4 and 5 are views for graphically illustrating relationships between the peak values of detected sound signals produced by applying predetermined impulsive energy or force to a side wall of the vessel and sound propagation distances.

FIG. 2 shows relationships between the detected peak values of all the impulsive sound signals and the distances extending from the positions of the impulsive sound sources to all the sound detectors, respectively, i.e. sound propagation distances. In FIG. 2, data derived from the outputs of all the detectors $S_1$ to $S_9$ shown in FIG. 1 are plotted. Further, it should be mentioned that the position of the impulsive sound source for reference is located not only in the region $P_A$ enclosed by a circle but in a number of other regions distributed over the side wall of the vessel, although the other regions of the sound sources are not shown in FIG. 1 for simplification of illustration. Each data of the peak values as plotted corresponds to an average of the peak values obtained by applying three times the reference impact to the vessel at a same reference sound source position. The probability of the peak value of the sound signal being reproduced by the reference impact of same energy at a same position and detected by a same detector is more than 90%. In contrast, the detected peak value of the impulsive sound produced by same impact energy will vary by about one order of magnitude among the different detectors notwithstanding that the propagation distances between the sound source position and the detectors are constant, as will be seen in FIG. 2. This variation or dispersion of the peak value is far remarkable when compared with variation in the peak value of the impulsive sound produced at a same position and detected by one and the same detector (which variation is within ±10%, since the probability of reproducibility of the peak value in the latter case is more than 90%, as mentioned above). For this reason, the value of kinetic energy E calculated in accordance with an expression (11) described later on the basis of the detected peak value will possibly vary by about two orders of magnitude, involving thus great error in the estimation of kinetic energy E. There may be enumerated several causes which give rise to the remarkable variations in the peak value of the impulsive sound produced by same impact energy at a same location and detected by different detectors disposed at the same propagation distance relative to the position of the impulsive sound source. Above all, interference of the sound waves may be mentioned as one of the major causes in the case of the cylindrical vessel. More specifically, the sound wave originating in a given sound source propagates clockwise on one hand and counterclockwise on the other hand before reaching the detector, whereby mutual interference takes place. Even when the sound wave propagating clockwise is different in phase only slightly from the sound wave propagating counterclockwise at the position of a given detector, the peak value of the sound signal produced by that detector will vary significantly. Accordingly, in order to evade the variation in the peak value, the impulsive sound should be measured by the detector disposed at a position where the mutual interference scarcely takes place.

Figure 3:
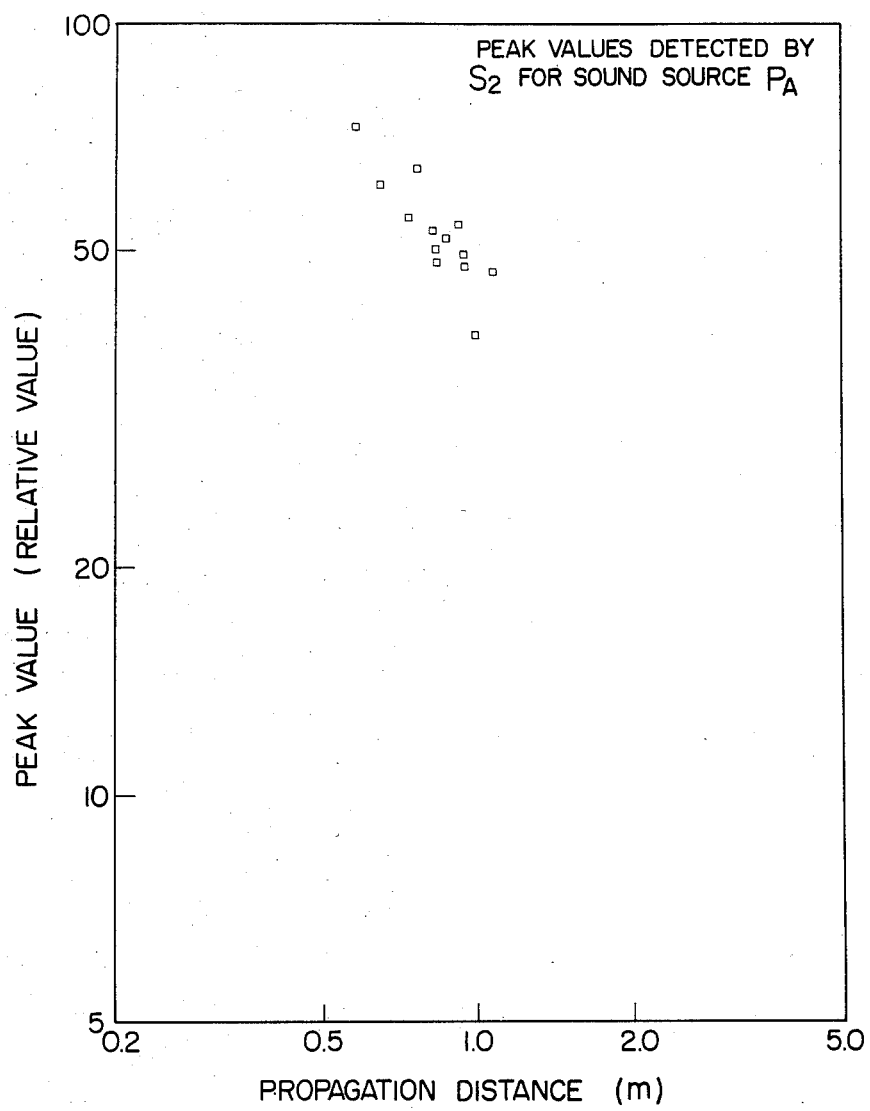
Figure 4:
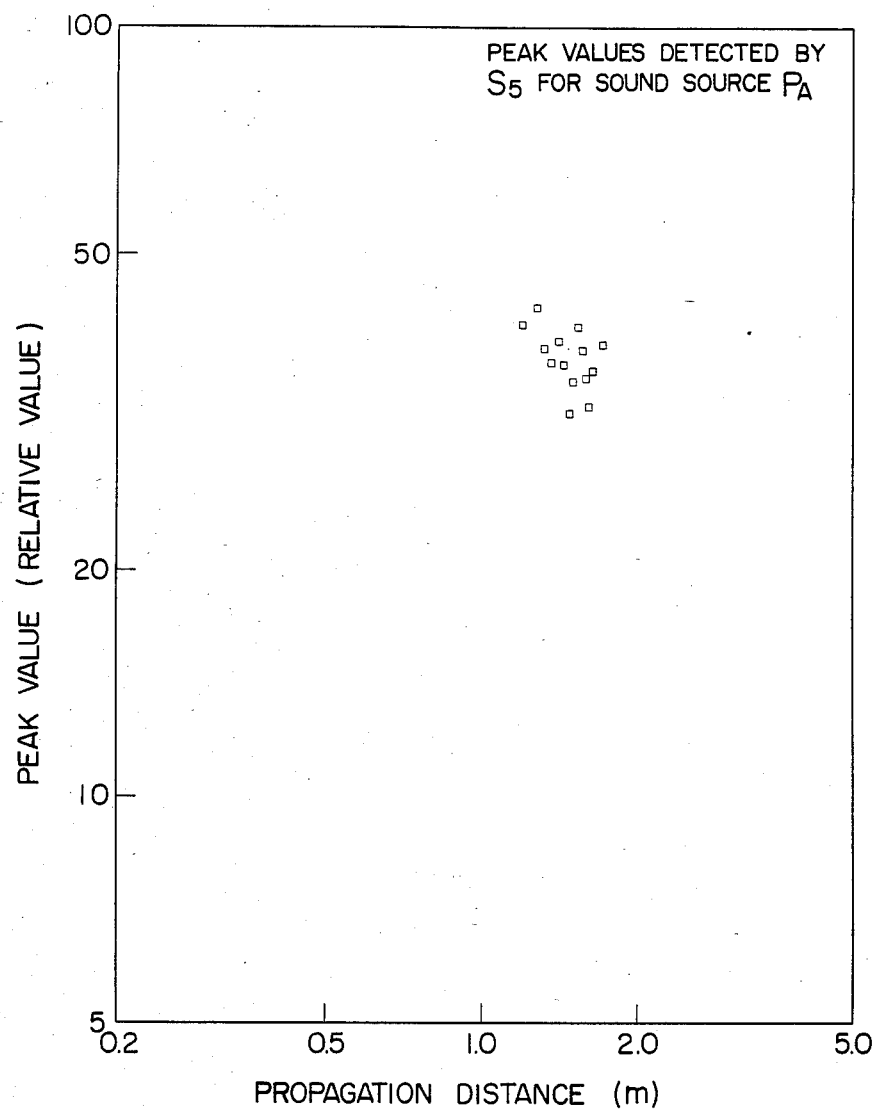
Figure 5:
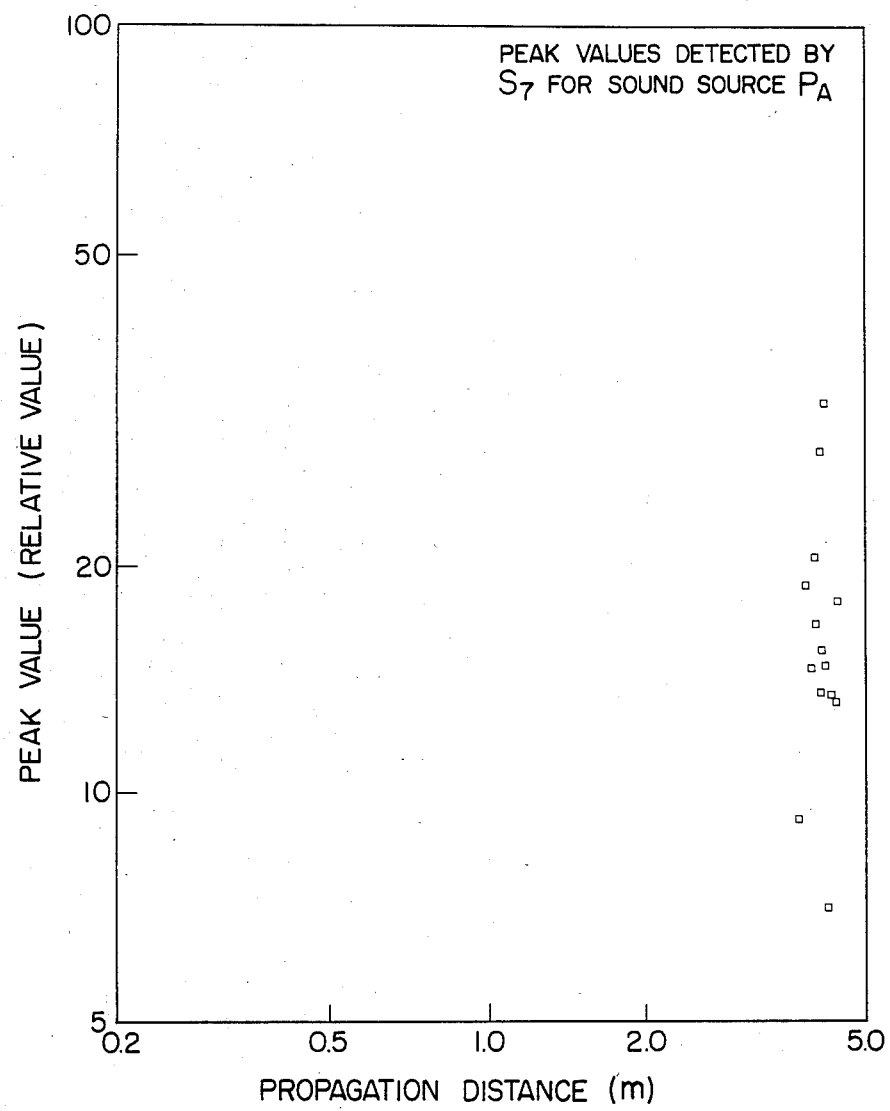

FIG. 3 shows relationships between the peak values of the sounds detected by the detector $S_2$ shown in FIG. 1 and the propagation distances, when the impulsive sounds are produced at the region $P_A$ by the impulsive force of same energy. In FIGS. 4 and 5, there are plotted corresponding data obtained for the detectors $S_5$ and $S_7$, respectively, in the similar manner. Now, the data plotted in FIGS. 3, 4 and 5 will be examined. It will be seen from FIG. 3 that variations or dispersion of the peak value is significantly reduced. This may be explained by the fact that the detector $S_2$ and the sound source region $P_A$ are in such positional relationship that the sound wave propagating counterclockwise is predominantly detected by the detector $S_2$ while the sound wave propagating clockwise along the side wall of the cylindrical vessel is much attenuated, bringing about no remarkable interference. Accordingly, dispersion of the peak values of the detected sound signals is significantly reduced. The longer propagation distance is about twice as long as the shorter one. The peak value becomes higher, as the propagation distance decreases. Accordingly, distribution of the peak values is by and large linear, presenting a negative slope inclined downwardly to the right as viewed in the figure. FIG. 4 shows data experimentally obtained for the impulsive sound wave propagating clockwise along the side wall of the vessel and detected by the detector $S_5$ shown in FIG. 1. In this case, the sound wave which travels counterclockwise and reaches the detector $S_5$ has to make substantially one round along the cylindrical side wall of the vessel. Interference between both the sound waves propagating in the opposite directions may be considered negligible. Thus, dispersion of the peak values remains relatively small. Further, since the maximum propagation distance is only about 1.4 times as long as the minimum propagation distance, dispersion of the peak value data presents no significant dependence on the propagation distance. It will be seen that dispersion or variation of the peak values in within ±15% in the measurements illustrated in FIGS. 3 and 4. In contrast, in the case of the measurements illustrated in FIG. 5 where the impulsive sound generated at the region $P_A$ is caught by the detector $S_7$, dispersion or variation of the peak values is significant, wherein the maximum peak value is about five times as great as the minimum value. This may be explained by the fact that substantially no difference is present in respect to the propagation distance between the sound traveling clockwise and the sound traveling counterclockwise, resulting in occurrence of the mutual interference between both sound waves at the location of the detector $S_7$, as will be apparent from the positional relationship between the sound source region $P_A$ and the detector $S_7$.

Now, the invention will be described in more detail in conjunction with an exemplary embodiment thereof which is applied to an apparatus for measuring sound source position and impulsive energy generated in a pressure vessel.

Figure 6:
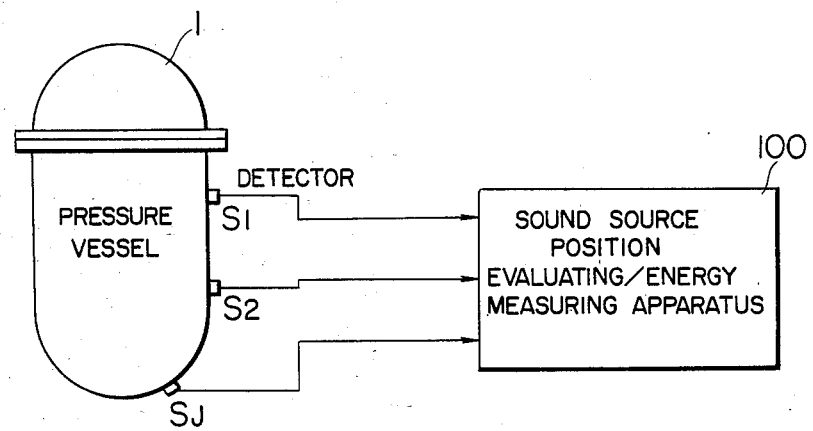
FIGS. 6 and 7 are views showing a sound source evaluating apparatus according to an exemplary embodiment of the invention.
Figure 7:
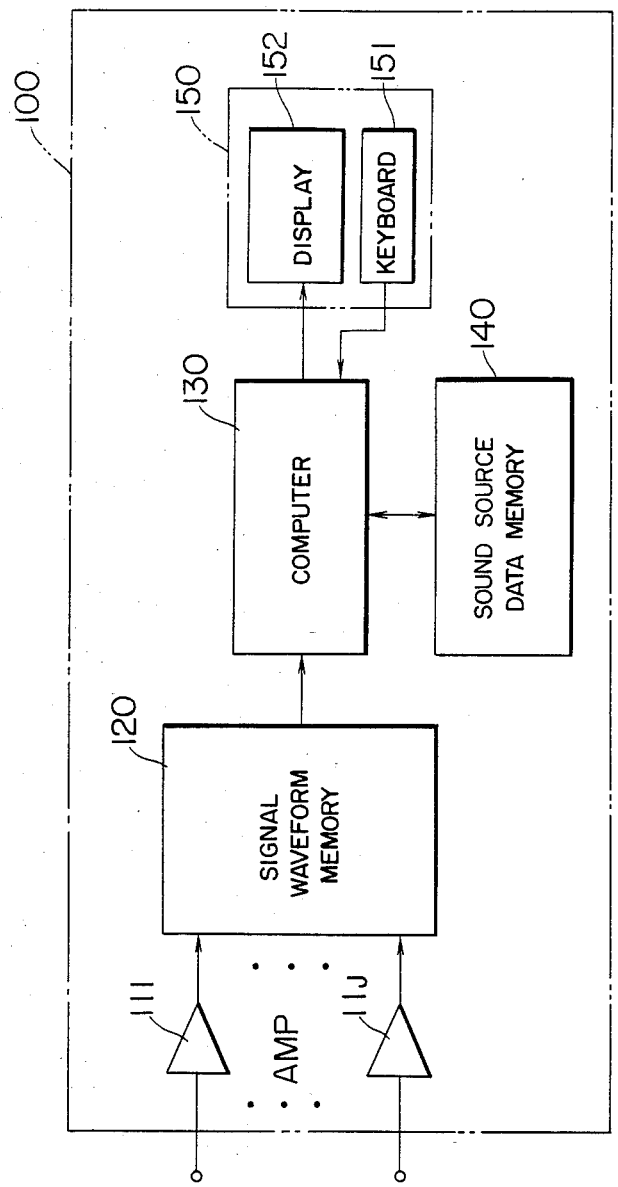

FIGS. 6 and 7 show schematically a preferred embodiment of the invention.

Referring to FIG. 6, numeral 1 denotes a pressure vessel on which J detectors $S_1, S_2, \ldots, S_J$ are installed. The detection signals outputted from these detectors are supplied to the input of a sound source position evaluating and impulsive energy measuring unit 100, which is implemented in such an arrangement as shown in FIG. 7. Referring to FIG. 7, the output signals of the sound detectors $S_1, S_2, \ldots, S_J$ are amplified through respective amplifiers $11_1, 11_2, \ldots, 11_J$ and subsequently supplied to a signal waveform storage device or memory 120 which is, for example, so arranged that signal waveforms outputted by the individual detectors S are stored over a period of several ten milli-seconds, starting from the first detection of the impulsive sound. The signal waveforms as stored are analyzed by a sound source position evaluating and impact energy measuring computer 130, whereby information or data required for the evaluation of the sound source position and determination of the impulsive energy are derived. Reference numeral 140 denotes a reference sound source storing unit or memory in which data of differences in signal arrival time among the detectors and the peak values of the sound signals produced by the detectors in response to the impacts applied to the pressurized vessels at predetermined regions by means of a hammer or the like are recorded as standard pattern data in association with the hammered locations (i.e. the known reference sound source positions). Additionally, the kinetic energy of the hammer upon impacting may be stored for determining the kinetic energy of an unknown sound source.

Now, description will be made in detail on the sound source position evaluation method based on the pattern recognition technique as well as the distance pattern correcting method according to the invention.

Figure 8:
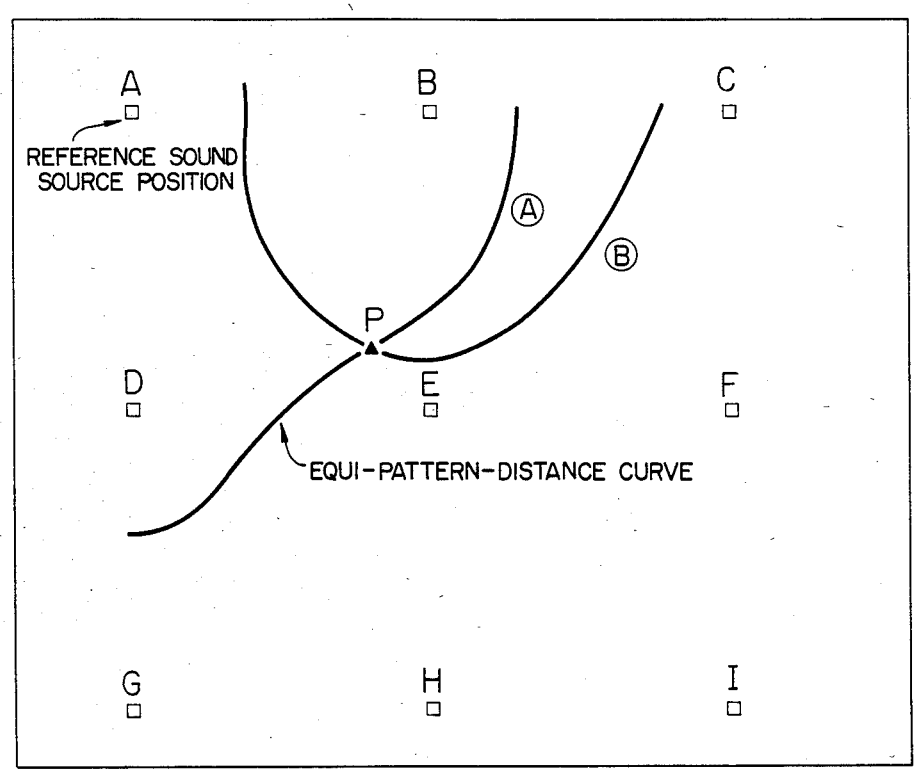
FIG. 8 is a view for illustrating the concept underlying the sound evaluating apparatus according to the invention.

FIG. 8 shows in a developed view a portion of a side wall of a pressure vessel. In the figure, symbols A, B, C, ..., and I denote the reference sound source positions, and P denotes an unknown sound source whose position is to be evaluated. In the evaluating method according to the embodiment of the invention, curves representing the pattern distances between the unknown sound source P and at least three of the reference sound source positions A, B, ..., and I are plotted, wherein the position of the unknown sound source P is determined as being located at the intersection of the curves. The major problem to be solved by the present invention resides in determination of the distances (or paths) extending from the individual reference points A, B, C, ..., I to the unknown sound source P with the aid of the pattern distances which are derived from the sound data.

The pattern data $D^A(A,P)$ between two sound sources A and P derived from the peak value data and the pattern distance $D^T(A,P)$ derived from the arrival time data are given by the following expressions (1) and (2):

$$D^A(A,P) = \left\{ \frac{\mathrm{Var}_j(\ln a_{Aj} - \ln P_j)}{\sqrt{\mathrm{Var}_j(\ln a_{Aj}) \cdot \mathrm{Var}_j(\ln P_j)}} \right\}^{\frac{1}{2}} \quad (1)$$

$$D^T(A,P) = \left\{ \mathrm{Var}_j(\tau_{Aj} - \tau_{Pj}) \right\}^{\frac{1}{2}} \quad (2)$$

where $a_{Aj}, P_j$: peak values of the signals produced by the j-th detector in response to the sound sources A and P, respectively, $\tau_{Aj}, \tau_{Pj}$: sound signal detecting time points at which sounds originating in the sound sources A and P are detected by the j-th detector (also referred to as the sound signal arrival time), and $\mathrm{Var}_j$: a symbol representing dispersion (where $j = 1, 2, \ldots, J$).

By the way, the distance between the sound source and the detector has the following relationships to the peak value and the signal arrival time:

$$a_{Aj} = K_a \cdot r_{aj}^{-J} \quad (3)$$

$$P_j = K_p \cdot r_{pj}^{-J} \quad (4)$$

$$\tau_{Aj} = \tau_o + r_{aj}/V \quad (5)$$

$$\tau_{Pj} = \tau_o + r_{pj}/V \quad (6)$$

where $r_{aj}, r_{pj}$: distances to the j-th detector from the sound sources A and P, respectively, J: attenuation constant of sound which depends on the medium, V: speed of sound which depends on the medium, $k_a, k_p$: constants determined by magnitude (energy level) of impulsion, and $\tau_o$: time point at which impulsion occurs.

From the expression (3) to (6), the expressions (1 and (2 can be rewritten as follows:

$$D_C{}^A(A,P) = \left\{ \frac{\mathrm{Var}_j(\ln r_{aj} - \ln r_{Pj})}{\sqrt{\mathrm{Var}_j(\ln r_{aj}) \cdot \mathrm{Var}_j(\ln r_{Pj})}} \right\}^{\frac{1}{2}} \quad (7)$$

$$D_C(A,P) = \frac{1}{V} \left\{ \mathrm{Var}_j(r_{aj} - r_{Pj}) \right\}^{\frac{1}{2}} \quad (8)$$

In the above expressions (7) and (8), the pattern distances $D^A(A,P)$ given by the expressions (1) and (2) are attached with a suffix "C", which means that the pattern distances given by the expressions (7) and (8), respectively, are determined by theoritical calculation on the assumptions given by the expressions (3), (4), (5) and (6) in contrast to the pattern distances given by the expressions (1) and (2) which are determined on the basis of the actually measured sound data. Since the procedures described below hold true both for the peak value data and the arrival time data, description will be made in conjunction with the peak value data for convenience's sake.

In accordance with the expression (7), the pattern distance between the unknown sound source P located at a given position and the reference sound source position A can be determined through calculation by using the peak value data. Accordingly, the intersource distance between A and P (i.e. distance between the reference sound source A and the unknown sound source P) can be determined in accordance with the procedure including steps mentioned below.

(1) The region which covers the reference sound source position A is divided appropriately into a mesh-like pattern or lattice, and assuming that an unknown sound source P is present at each of the mesh points (or lattice points), the pattern distances $D_C{}^4(A,P)$ between the reference sound source position A and the unknown sound source positions P are determined through calculation in accordance with the expression (7).

(2) When an unknown sound source P is detected, the pattern distance $D^4(A,P)$ is determined in accordance with the expression (1) on the basis of the sound data derived from the outputs of the individual detectors in response to the unknown sound source P and the data concerning the reference sound source positions stored in a memory.

(3) Among the pattern distances calculated at the step (1) for every mesh points, the pattern distances whose values coincide with the actually measured value of the pattern distance determined at the step (2) are selected, and the mesh points associated with the selected pattern distances are interconnected by a line, whereby a curve A shown in FIG. 8 is plotted. It will be noted that the pattern distances between unknown sound sources located at any given points on this curve Ⓐ and the reference sound source Ⓐ coincide with the pattern distance $D^4(A,P)$ determined in accordance with the expression (1). Thus, the curve A may be termed the equi-pattern-distance curve.

(4) For the reference sound source positions B to I, the procedures mentioned at the steps (1) to (3) are executed, whereby nine equi-pattern-distance curves are obtained. It is determined that the unknown sound source is located at the intersection of the nine curves. In FIG. 8, there are shown only two equi-pattern-distance curves Ⓐ and Ⓑ of the nine curves which correspond to the reference sound source position A and B, respectively.

By the way, for the evaluation of the unknown sound source, three equi-pattern-distance curves should ideally be determined for three reference sound source positions, respectively. Then, the unknown sound source position is determined to be located at the intersection of the three curves. However, in actuality, it is extremely rare that the three curves intersect one another at a single point, because various errors are involved. Accordingly, the procedures described above apply valid so far as the fundamental principle is concerned. In reality, it is impossible to evaluate the unknown sound source position with any reasonable accuracy solely through the procedures mentioned above. The major reasons may be explained by the facts which will be described below. The expression (7) is derived from the expression (1) on the assumptions given by the expressions (3) and (4). In this connection, it should be recalled that the attenuation constant J included in the expressions (3) and (4) is not in reality a constant value but varies in dependence on the configuration of medium for sound propagation. When the medium is, for example, in the form of a round rod and thus may be regarded to be of a one-dimentional configuration, the attenuation constant J is approximately equal to 0 (zero), while in the case of medium of a two-dimentional configuration (i.e. plane), the attenuation constant J approximates to 1 (one). In the case of medium of a three-dimensional configuration, $J \approx 2$. In most cases, the actual structure to which the evaluation method according to the invention is to be applied is of much complicated configuration. Accordingly, the attenuation constant J varies in a range of 0 to 2 in dependence on the various locations of the structure. Further, amplitude of the sound wave undergoes variations due to interference among the sound waves which follow different propagation paths. Accordingly, the expressions (3) and (4) do not necessarily apply valid in practice. For these reasons, the pattern distance $D_C{}^4(A,P)$ calculated in accordance with the expression (7) rarely coincides with the pattern distance $D^4(A,P)$ determined in accordance with the expression (1). Ideally, the attenuation constant J should be measured at all the concerned local positions of the structure. However, this is impossible in practical applications. To dispose of this difficulty, the present invention teaches that the pattern distance be corrected, as mentioned below.

Again referring to FIG. 8, it is assumed that the pattern distance between the reference sound source position A and the mesh point P is to be determined through calculation. When the mesh point P coincides with a given one of the reference sound source positions B to I except for the reference position A, there are available both the actually measured pattern distance $D^4(A,P)$ determined in accordance with the expression (1) and the calculated pattern distance $D_C{}^4(A,P)$ according to the expression (7). Here, it may be presumed that when the mesh point coincides with a given one of the reference sound source positions B, C, ..., and I, the actually measured value $D^4(A,P)$ is more accurate than the calculated value $D_C{}^4(A,P)$. On this presumption, the actually measured value $D^4(A,P)$ is utilized in place of the calculated value $D_C{}^4(A,P)$. In case the mesh point P is located at the position which does not coincide with any of the reference sound source positions, the calculated pattern distance $D_C{}^4(A,P)$ can be corrected through interpolating procedure mentioned below in consideration of the actually measured values $D^4(A,P)$ for the mesh points P which are located at the reference sound source positions other than the position A. The corrected or modified pattern distance $D_M{}^4(A,P)$ is given by $$D_M{}^4(A,P) = D_C{}^4(A,P) \cdot \sum_{i=B-I} \frac{M_{A,i}}{R_{P,i}} / \sum_{i=B-I} R_{P,i} \qquad (9)$$

where $R_{p,i}$ distance between the mesh point P and the reference sound source position i (where i is one of B, C, ..., I), and $M_{A,i}$ is determined in accordance with $$M_{A,i} = \frac{D^A(A,i)}{D_C^A(A,i)} \quad (10)$$

where i is one of B, C, ..., I.

As will be seen, correction of the calculated pattern distance $D_C^A(A,P)$ for a given mesh point P can be realized by weighting the value $D_C^A(A,P)$ by the reciprocal of the distance from the position for which the actually measured value is present.

Similarly, the corrected or modified pattern distance $D_M^T(A,P)$ derived from the arrival time data is given by $$D_M^T(A,P) = D_C^T(A,P) \cdot \sum_{i=B-I} \frac{M_{A,i}}{R_{P,i}} / \sum_{i=B-I} R_{P,i}$$

where $M_{A,i}$ is determined in accordance with $$M_{A,i} = \frac{D^T(A,i)}{D_C^T(A,i)} \quad (i = B, C, \ldots, I) \text{ and}$$

$D^T(A,i)$ is the actually measured pattern distance.

The sound source evaluating method according to the invention can be carried out with an apparatus shown in FIGS. 6 and 7.

Figure 9:
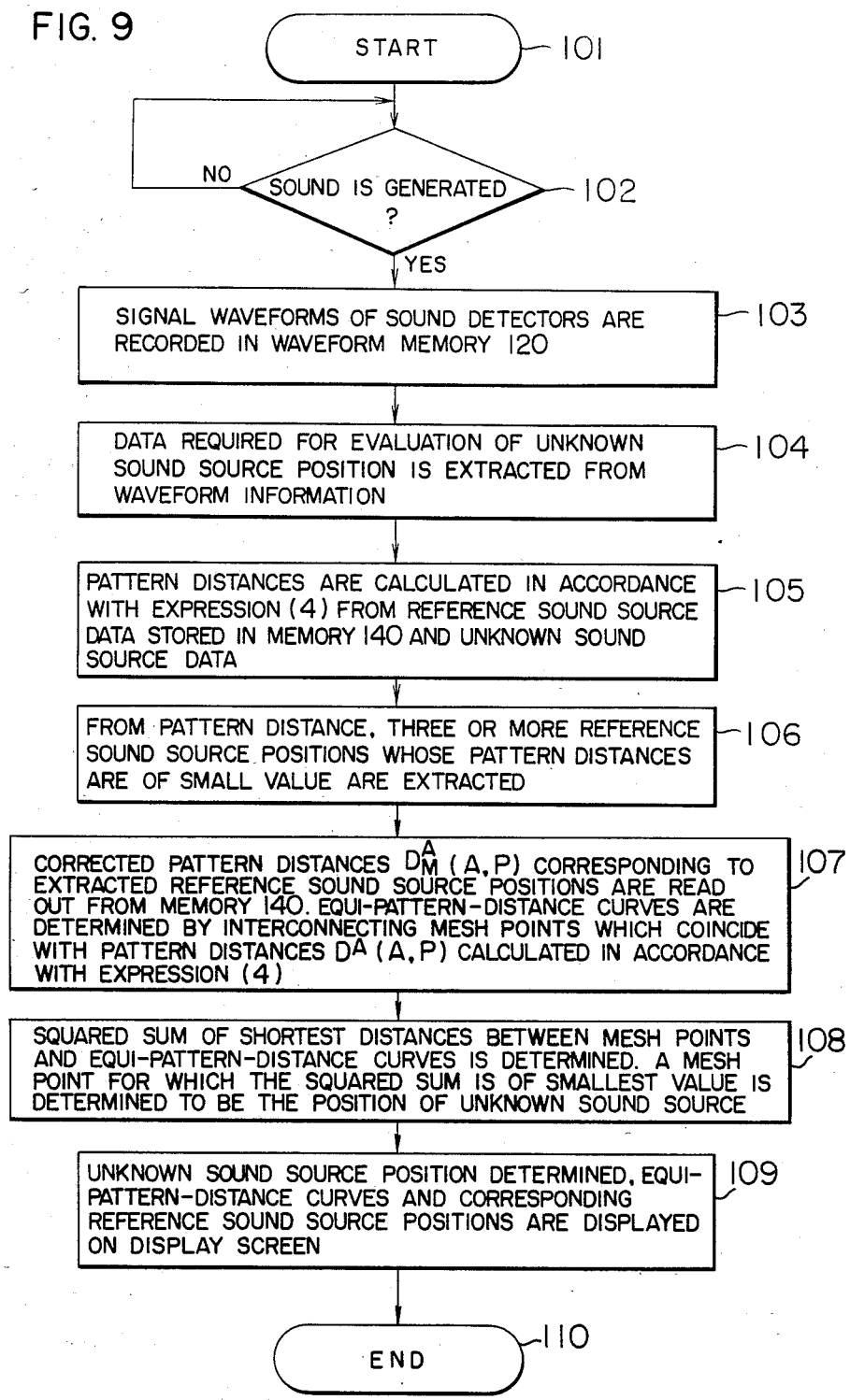
FIG. 9 is a flow chart illustrating operations of the apparatus according to the embodiment.

Referring to FIG. 7, a sound source data memory 140 includes first and second auxiliary memories. The first auxiliary memory serves to store therein the data concerning the reference sound sources located at appropriate positions on the pressure vessel 1. On the other hand, the second auxiliary memory stores, for every reference sound source position, the data of pattern distances $D_M^A(A,P)$ between the individual mesh points resulting from the division of the side wall of the pressure vessel into a mesh pattern (or lattice) and the reference sound source positions. The computer 130 executes jobs in accordance with the procedure illustrated in a flow chart of FIG. 9. Referring to FIG. 9, the computer 130 set in the monitoring mode monitors constantly occurrence of the impulsive sound at a step 102. When any one of the detectors last detects the generation of the sound, the waveforms of the signals outputted by all the detectors are stored in the waveform storage unit 120. In an exemplary arrangement, the waveform storage unit 120 includes a number of memories each of 1K words in one-to-one correspondence with the output signals of the detectors. At the step 102, these memories continues to store constantly the respective updated waveform data for the past several ten milli-seconds by discarding the old data. When the sound generation is detected at the step 102, the storing of the waveform data by the memories is interrupted. At a step 104, data of the peak values and/or sound arrival times of the individual detectors are derived from the waveform data stored in the waveform storage unit 140. At a step 105, data concerning the individual reference sound source positions stored in the first auxiliary memory of the storage unit 140 are sequentially read out to be utilized together with the data derived at the step 104 in the calculation of the pattern distance $D^A(A,P)$ and/or $D^T(A,P)$. At a step 106, an appropriate number (e.g. more than 3 inclusive) of the reference sound source positions which present the smallest value for the pattern distance calculated at the step 105 are selected. At this level of the procedure, several reference sound source positions which are estimated to be located close to the unknown sound source are selected. At a step 107, calculated data of the pattern distances $D_M^A(A,P)$ corresponding to the reference sound source positions selected at the step 106 are read out from the second auxiliary memory. The pattern distance $D_M^A(A,P)$ represents the calculated pattern distance data concerning the peak value which have undergone the correction. Instead of $D_M^A(A,P)$ the corrected pattern distance data $D_M^T(A,P)$ concerning the sound arrival time may be stored in the second auxiliary memory and read out, if necessary. Since the sound arrival time data and the peak value data are processed in the same manner, following description will be made in conjunction with the peak value data. Further, although the reference sound source is typified by the reference source A, the latter may be replaced by another suitable one B, C, ..., or I. Those mesh points which coincide with or approximate the pattern distance $D^A(A,P)$ calculated at the step 105 are selected on the basis of the corrected pattern distances $D_M^A(A,P)$ read out from the second auxiliary memory, which is followed by determination of the equi-pattern-distance curves for all the selected mesh points or reference sound source positions. By displaying the plurality of the equi-distance-pattern curves on a display device 152, the unknown sound source can be determined to be present at the intersection of these curves. However, since all the curves do not necessarily intersect one another at a single point, the procedure indicated at a step 108 is performed. More specifically, the mesh points P are successively shifted, wherein the shortest distances to the individual equi-pattern-distances from every shifted position are determined, to calculate a squared sum of the shortest distances. Among the mesh points, the one for which the squared sum is minimum is selected and estimated to be the position of the unknown sound source. This mesh point selected in this way can represent the unknown sound source position with the highest probability, because the mesh point as selected is of the minimum value in the squared sum of the distances to every equi-pattern-distance curve. Subsequently, at a step 109, the position of the unknown sound source thus determined, the equi-pattern-distance curves and the reference sound source positions corresponding, respectively, to the equi-pattern-distance curves are displayed on the screen of the display device 5.

Figure 10:
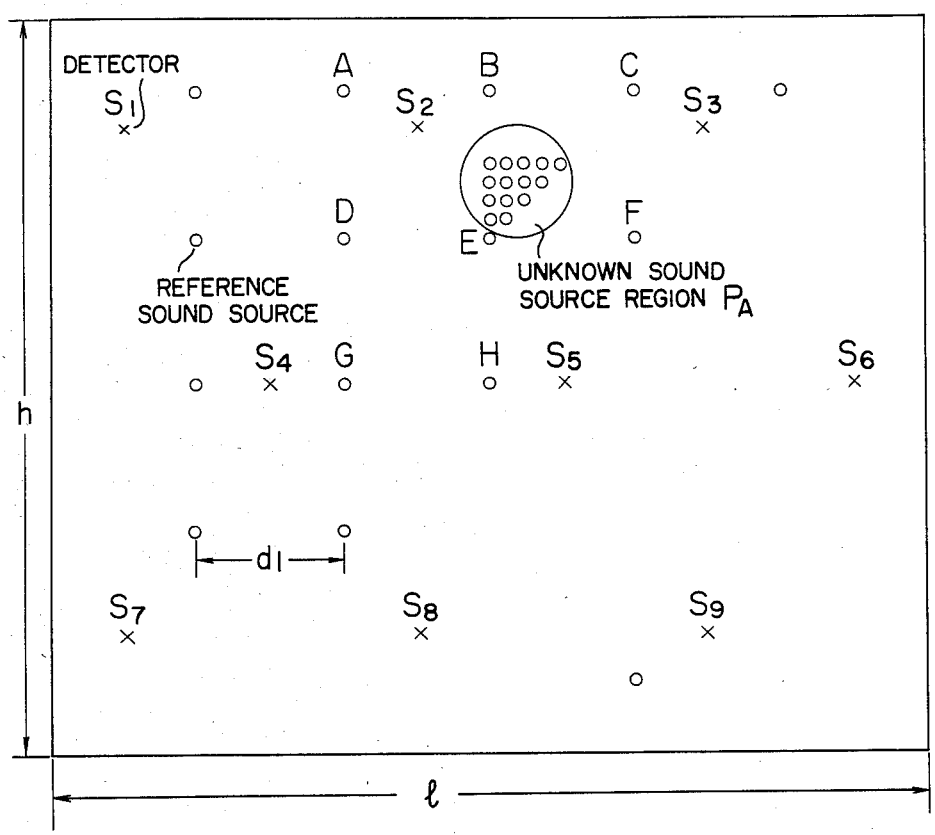
FIG. 10 is a developed view of a tank used in experiments performed according to the embodiment of the invention.

In the following, description will be made on the results of an experiment in which the illustrated method of the invention is applied to evaluation of an unknown sound generated in a steel vessel of a small size (having a diameter of 2 m and a height of 5 m). FIG. 10 shows in a developed view a side wall of the cylindrical steel vessel or tank. As will be seen in FIG. 10, nine sound detectors $S_1, S_2, \ldots, S_9$ installed on the side wall of the tank are illustrated together with the positions of the impulsive sound sources which are generated by hammering the tank wall. The sound sources arrayed regularly with a distance $d_1$ (=1 m) are dealt with as the reference sound sources, while the sound sources represented by small circles and located within a region $P_A$ are handled as the unknown sound sources.

As seen from FIGS. 2 to 5, the evaluation accuracy will be improved if suitable detectors are selected for determining the position. Namely, when the pattern distance for a reference sound source is to be calculated, only the detectors near the reference sound source should be used.

Figure 11:
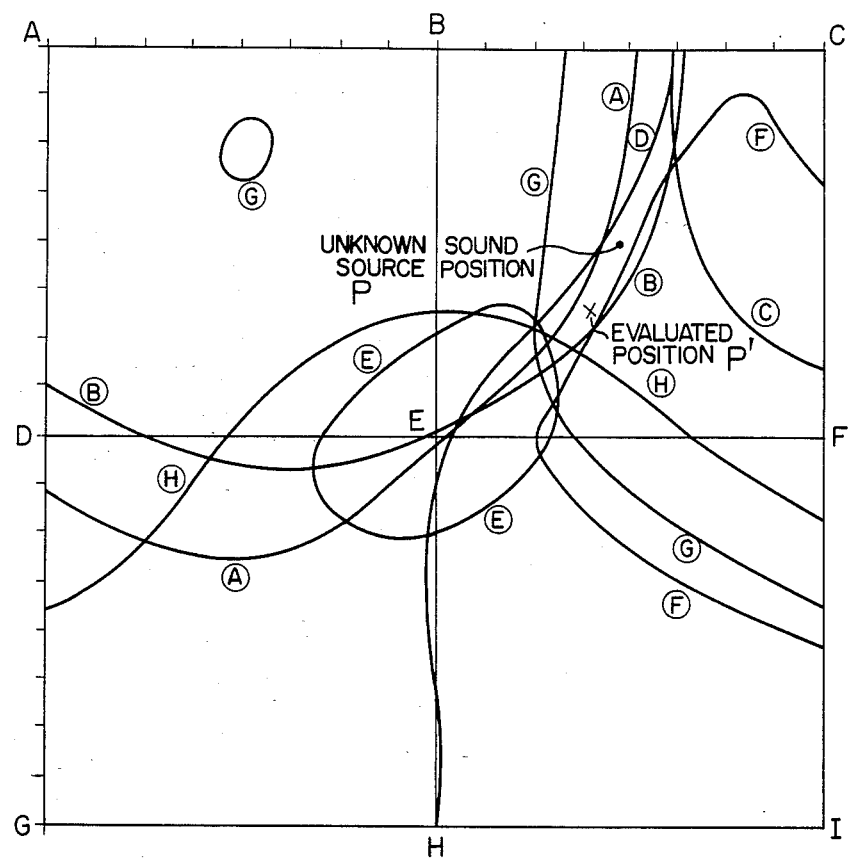
FIG. 11 is a schematic diagram illustrating sound source position evaluating procedures performed according to the embodiment of the invention.

Now, a concrete example of the evaluating method according to the invention adopted in the experiment will be elucidated by also referring to FIG. 11 on the assumption that the reference sound sources are located at the positions A, B, . . . , H while the unknown sound source is located at a single point (represented by a circle) within the region $A_p$, as shown in FIG. 10. Reference letters attached to the curves illustrated in FIG. 11 correspond to the reference sound source positions A, B, C, . . . , H, respectively. These curves are obtained through procedure including the steps mentioned below. (Although description will be made in conjunction with the curve (A), applies valid to the determination of the other curves.)

(1) Referring to FIG. 11, sides AC and AG are each divided into 32 segments to prepare 32×32 mesh points within a quadrilateral AGIC.

(2) The pattern distances between each of the mesh points and the reference sound source position A are calculated in accordance with the expression (7).

(3) The pattern distances between the reference sound source position and the other reference sound source positions D to H, respectively, are determined on the basis of the peak value data in accordance with the expression (1).

(4) The pattern distances determined for the mesh points at the step (2) are corrected in accordance with the expressions (9) and (10).

(5) The pattern distance between the unknown sound source and the reference sound source position A is determined on the basis of the peak value data in accordance with the expression (1).

(6) The pattern distance determined at the step (5) is compared with the pattern distance determined for the mesh point and corrected at the step (4), to thereby determine those mesh points for which both of the pattern distances coincide with each other.

(7) By interconnecting the mesh points selectively determined at the step (6), an equi-pattern-distance curve (A) is plotted.

(8) The curve presents the same value as the actually measured value of the pattern distance between the unknown sound source and the reference sound source position A.

(9) The above steps (1) to (8) are carried out for the other reference sound source positions B, C, . . . , H, to obtain the curves (B), (C), . . . , (H), respectively.

These curves (A) to (H) are of relatively complicated forms. In particular, it is noted that the curve (G) is separated into two curved segments. This may be explained by the fact that the calculated pattern distance $D_C^A(A,P)$ given by the expression (7) or the modified pattern distance $D_M^A(A,P)$ given by the expressions (9) and (10) are not monotonous when compared with the distances from the reference sound source positions to the mesh points. In practical applications, however, this provides no substantial problem.

Th detectors employed in the procedure for obtaining the curves (A) to (H) are $S_2$, $S_3$, $S_4$, $S_5$ and $S_6$, while the detectors $S_1$, $S_7$, $S_8$ and $S_9$ which are located remotely from the reference points are excluded from the use because dispersion of the data would otherwise become significant. The position of the unknown sound source can be immediately identified when all of the equi-pattern-distance curves (A) to (H) pass through the point where the unknown sound so is located. However, for the reasons described hereinbefore, it is very rare that all of these curves pass through the unknown sound source position, as is illustrated in FIG. 11, giving rise to error in the results of the evaluation. To evade this difficulty, the position of the unknown sound source may be determined through the procedure including the following steps.

(1) At the level where the curves (A) to (H) are determined, the shortest distance from each of 32×32 mesh points to the curves (A) to (H), respectively, are determined.

(2) Subsequently, the squared sum of the shortest distances to the curves (A) to (H) is determined for each of the mesh points.

(3) Next, the mesh point for which the squared sum is minimum is selected and determined to be the position of the unknown sound source.

The position of the unknown sound source determined through the evaluating procedures described above is indicated by P′ in FIG. 11. It has been found that the unknown sound source position thus determined suffered error or difference of 20 cm relative to the actual sound source position P.

It has further been found that error involved in the evaluations performed on all fourteen points located within the region A shown in FIG. 10 was 16.8 cm on an average.

In the case of the embodiment of the invention, the pattern distances between reference sound source points and a given point are theoritically determined in accordance with the expression (7) and thereafter corrected or modified with the actually measured data in accordance with the expressions (9) and (10). An important feature of the embodiment of the invention resides in the correcting procedure. The expression (7) is derived from the expression (1) through substitution by the expressions (3) and (4). In this connection, it should be noted that the expressions (3) and (4) are approximate expressions on the assumption that the attenuation constant J is constant. However, the attenuation constant J is in reality a variable which depends on the positions of the sound source and the detector. In order to determine accurately the values of J, the impulsive sound has to be produced at all the mesh points on the pressure vessel which are located with a distance smaller than the desired minimum value of the evaluation error, to thereby obtain the required sound data. This procedure, however, is unrealistic. In this conjunction, it will be understood that when the locations of the sound sources are limited within a particular region and detected by predetermined ones of the detectors as described hereinbefore, dispersion or variation in the peak value data as obtained can remain within a limited small range. For this reason (i.e. due to negligible variations in the peak values data), the correction or modification of the reference sound source data can be regarded to be valid. In other words, the evaluation of an unknown sound source position can be performed reasonably accurately by resorting to the correcting procedure even though the value of the attenuation constant J can not be definitely determined in reality. Another advantageous effect attributable to the correcting procedure can be seen in that the number of the reference sound source positions can be reduced. For example, suppose that the invention is applied to a pressure vessel of a nuclear reactor having electrical output power on the order of 1000 MW. In that case, the size of the pressure vessel is about three times as great as that of the tank employed in the experiment described hereinbefore. Accordingly, the distance ($d_1$ in FIG. 10) between the adjacent reference sound source points will be increased to 3 m, and the number of the reference sound sources is about 40. On these conditions, error involved in the evaluation is expected to be on the order of 50 cm. Accordingly, if the error up to 1 m is tolerable, the number of the reference sound sources can be correspondingly reduced. By making use of the sound arrival time data in combination with the peak value data, the accuracy of evaluation can further be improved. In reality, unless the correcting procedure according to the invention is adopted, the reference sound sources will have to be disposed with a space of about 1.5 m in the case of the pressure vessel for the nuclear reactor of 1000-MW class. In contrast, by resorting to the correcting procedure taught by the invention, it is expected that the number of the reference sound sources can be reduced to $\frac{1}{4}$ to 1/10 of the number of the reference sound sources required in the supposed case.

A method of determining kinetic energy of unknown sound source will next be described.

Heretofore, kinetic energy E of a body such as foreign material or loose part impacting against a structure has been detected with the aid of sound detectors (such as, for example, acceleration detector realized by making use of a piezo-electric transducer element) which are disposed at appropriate positions on the structure for detecting the impulsive sound in accordance with the following expression:

$$E = k \cdot a^2 \cdot r^{2J} \tag{11}$$

where a represents amplitude value of the output signal of the sound detector, r represents the distance between the location where the collision occurs and the position of the sound detector, k represents a constant determined by the sensitivity of the detector and other factors, and J represents an attenuation constant determined by attenuation which the impulsive sound experiences in the course of propagation. The above expression may apply valid in case the structure in concern is simple. However, in the case of a structure which is of a complicated configuration, the attenuation constant J assumes different values in dependence on propagation paths followed by the impulsive tone or sound, as the result of which significant error will be involved in the determination of kinetic energy in accordance with the above expression (11) on the assumption that the attenuation constant J is invariable. Further, in the case of a cylindrical structure such as a pressure vessel of nuclear reactor, there exist will usually be produced from a single sound source a sound wave propagating in the clockwise direction and a sound wave traveling counterclockwise, wherein both sound waves interfere each other, making it difficult to derive accurately the peak value of the impulsive sound by means of the sound detector and thus providing a major cause for the error involved in the measurement of the kinetic energy E.

However, error involved in the measurement of impulsive energy can be reduced by adopting the procedures including steps mentioned below.

(1) A plurality of sound detectors are disposed on a structure to be monitored.

(2) The structure is appropriately divided into a plurality of regions where impact for reference is applied to the structure with known impulsive energy $E_0$. In this connection, the impact may be applied at several points within the same region, which points are distanced from one another by a space on the order of a half of the wave length of the impulsive sound.

(3) The peak values $a_{ij}$ of the signals detected by the individual detectors $S_j$ in response to the reference impact or shock applied to the structure at the regions i with the known kinetic energy $E_0$ are recorded as the peak value data.

(4) Among the detectors, the one which suffers the minimum variation or dispersion of the peak values of the detection signals for a plurality of the reference impacts applied at each of the regions i is selected. In this case, if there are two or more detectors for which variation in the peak value of the detected signals are within a permissible range, these two or more detectors may be selected.

(5) When unknown impulsive sound is detected, the location of the unknown sound source P is evaluated, which is followed by identification or determination as to which of the regions i the unknown sound source P belongs, by making use of pattern distance determined in accordance with expression (4) mentioned hereinafter.

(6) When the region i to which the sound source P belongs has been identified, the peak value $P_j$ of the detection signal produced by the detector $S_j$ which corresponds to that region i, being selected at the step (4), is determined.

(7) The impulsive energy E is determined in accordance with the following expression:

$$E = E_o \left( \frac{P_j}{a_{ij}} \right)^2 \tag{12}$$

In this manner, the impulsive energy E (or the kinetic energy of a part impacting on the structure) can be determined. In this conjunction, if more accurate position of an unknown sound source can be evaluated as shown by FIG. 11, the impulsive energy E may be determined in accordance with the following equation provided that the attenuation constants J for different propagation distances has been previously determined on the basis of the peak value data.

$$E = E_o \left( \frac{P_j}{(a_{ij})_0} \right)^2 \cdot \left( \frac{r_{oj}}{R_j} \right)^{2J} \tag{13}$$

where
- $R_j$: distance from an unknown sound source P to the detector $S_j$,
- $r_{oj}$: distance from a specific position in the region i to the detector $S_j$, and
- $(a_{ij})_o$: peak value produced by the detector $S_j$ in response to the impact of known energy $E_o$ applied at the specific position within the region i.

For the measurement of the impulsive energy applied to a structure, it is prerequisite that the distance or range $r_{oj}$ from the detector to the unknown impact point or the region i to which the unknown impact point belongs be determined, i.e. the position of the impulsive sound source be evaluated. A variety of methods are known for the evaluation of the position of the impulsive sound source. Among them, a method based on a pattern recognition technique is effective particularly when the structure in concern is of a complicated configuration.

The kinetic energy of an unknown sound source is also measured by the apparatus shown in FIGS. 6 and 7. Namely, the pressure vessel is divided into I regions, wherein the peak value $a_{ij}$ of the output signal of the j-th detector $S_j$ corresponding to the sound source position at a typical point i in each of the divided regions is stored in the sound source data memory 140 together with signal arrival time difference data $\tau_{ij}$ representative of time lapse from the first detection of the impulsive sound to the detection by the j-th detector and the kinetic energy $E_i$ upon hammering. Besides, the identification numbers j0 of the detectors selected to be used for the measurement of impulsive energy produced at the regions i on the basis of the recorded data are also recorded.

When a detection signal originating in an unknown sound source P is supplied to the input of the signal waveform storing unit 120, the computer 130 is operative to derive from the waveform of this unknown sound source the peak values $P_j$ and the signal arrival time differences $\tau_j$ for the individual detectors $S_j$. On the basis of these data $P_j$ and $\tau_j$ (j=1, 2, ..., J) of the unknown sound source and the reference pattern data $a_{ij}$ and $\tau_{ij}$ (i=1, 2, ..., I and j=1, 2, ..., J) stored in the sound source data memory 140, evaluation of the sound source position for determining which of the region i the unknown sound source P belongs to is performed in accordance with the following experessions:

$$D^A(i,P) = \left\{ \frac{\underset{j}{\mathrm{Var}}\,(\ln a_{ij} - \ln P_j)}{\sqrt{\underset{j}{\mathrm{Var}}\,(\ln a_{ij})\,\underset{j}{\mathrm{Var}}\,(\ln P_j)}} \right\}^{\frac{1}{2}} \quad (14)$$

$$D^T(i,P) = \left\{ \underset{j}{\mathrm{Var}}\,(\tau_{ij} - \tau_j) \right\}^{\frac{1}{2}} \quad (15)$$

$$D^C(i,P) = (1 - \alpha) \cdot D^A(i,P) + \alpha \cdot D^T(i,P) \quad (16)$$

where $$\underset{j}{\mathrm{Var}}(X_j)$$

represents dispersion of $X_j$, and $D^A(i,P)$ represents the so-called pattern distance between the peak value data $P_j$ of the unknown sound source P and the reference peak value data $a_{ij}$ of the reference sound source position i. As the value of the pattern distance $D^A(i,P)$ becomes smaller, this means that the unknown sound source is located closer to the reference sound source. Further, $D^T(i,P)$ represents the pattern distance defined similarly on the basis of the signal arrival time difference data, and $D^C(i,P)$ represents a synthesization of both the pattern distances $D^A(i,P)$ and $D^T(i,P)$. When the synthesized pattern distance $D^C(i,P)$ is to be determined in accordance with the above expression (16), the constant $\alpha$ is selected to be a value in a range of 0 to 1. In this manner, the pattern distance $D^C(i,P)$ is arithmetically determined for each of the regions i (where i=1, 2, ... I), whereby the region i for which the pattern distance $D^C(i,P)$ is minimum is selected. The unknown sound source is determined to be located in the region i thus determined. After the region i has been identified, the reference peak value data $a_{ijo}$ corresponding to the identified region i and kinetic energy $E_i$ at which the reference sound source position i is hammered are read out from the reference data file stored in the memory 140, and the impulsive energy E of the unknown sound source is determined in accordance with the following expression (17) which is a version of the expression (12). That is, $$E = E_i \cdot \left( \frac{P_j}{a_{ijo}} \right)^2 \quad (17)$$

The region i in which the unknown sound source is located and the impulsive energy E thus arithmetically determined are then displayed on a CRT (cathode-ray tube) 150 provided with a keyboard 151. In this way, the region of the pressure vessel in which impulsion occurs as well as energy of the impulsion can be recognized.

Figure 12:
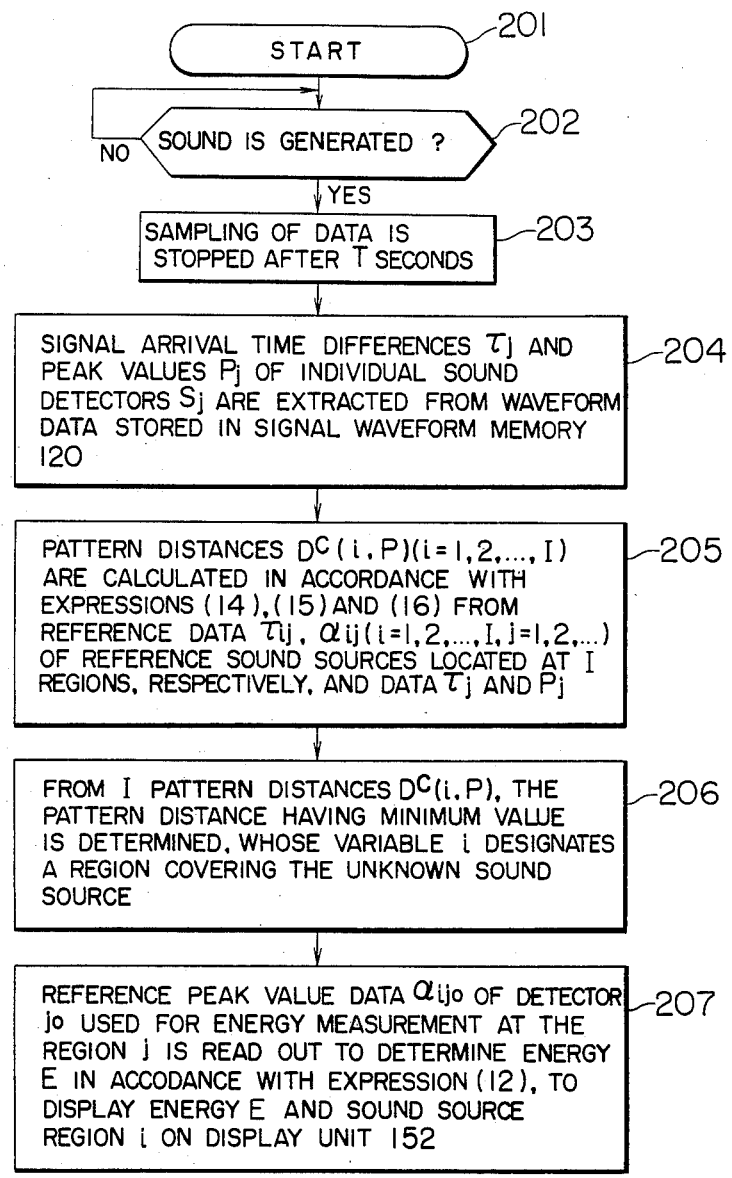
FIG. 12 shows a flow chart for illustrating operations of the sound source evaluating apparatus shown in FIGS. 6 and 7.

The procedure described above is summarized in a flow chart shown in FIG. 12. Referring to the figure, occurrence of sound is constantly monitored at a step 202. When generation of sound is first sensed by any one of the detectors, the procedure proceeds to a step 203 where the signal waveform storing unit 120 stops storage of sampled signal waveforms produced by the individual detectors $S_1, S_2, ..., S_J$ after lapse of several ten milli-seconds from the first detection of the sound. Subsequently, at a step 204, the signal arrival time differences $\tau_j$ and the peak values $P_j$ of the sound detected by the individual detectors $S_j$ are extracted from the waveform data of the unknown sound source P stored in the signal waveform storage unit 120 and loaded in the sound source data memory 140. At a step 205, the pattern distance $D^C(i,P)$ (i=1, 2, ..., I) is arithmetically determined on the basis of the reference data $\tau_{ij}$ and $a_{ij}$ concerning the individual reference sound sources located in the I regions, respectively, and the data $\tau_j$ and $P_j$ extracted at the step 204 in accordance with the expressions (14), (15) and (16). At a succeeding step 206, the pattern distance of the minimum or smallest value is selected from I pattern distances $D^C(i,P)$ (where i=1, 2, ..., I) as arithmetically determined at the step 206, whereby the region allotted with the identification number i corresponding to the selected pattern distance $D^C(i,P)$ of the minimum value is determined as the region in which the unknown sound source is located, i.e. the unknown sound source position. At a step 207, the reference peak value data $a_{ijo}$ of the reference sound source located in the region i and detected by the detector $S_{jo}$ to be used for the measurement of impulsive energy in that region i as determined on the basis of the reference data stored in the sound source data memory 140 is read out and utilized for arithmetically determining energy E in accordance with the expression (12). Thereafter, energy E and the sound source region u are displayed on a display unit (e.g. CRT, plotter, printer, etc.).

We claim:

1. A method of evaluating position of an unknown sound source in a structure, comprising steps of:
   (a) producing sequentially reference sounds from a plurality of known reference sound source positions in the structure, the region of said structure for which the unknown sound source position is to be evaluated being composed of a number of mesh points which is greater than the number of said reference sound sources;

(b) detecting said reference sounds produced sequentially by means of at least three sound detectors which are installed, respectively, at predetermined positions of said structure;

(c) preparing reference sound data on the basis of the detected reference sounds information, data of the positions of said reference sound sources and data of the positions of said sound detectors, said reference sound data being stored in storage means;

(d) preparing data of equi-pattern-distance curves each of which interconnects those mesh points which are in an equal pattern distance between a supposed unknown sound source and each of said reference sound sources on the basis of said reference sound data;

(e) correcting each of the equi-pattern-distance curves data on the basis of the pattern distances actually measured between the reference sound source associated with said equi-pattern-distance curve and at least one of the other reference sound sources, the corrected equi-pattern-distance curves data being stored in the storage means;

(f) detecting an unknown sound generated by an unknown sound source in said structure by means of the plurality of said sound detectors;

(g) preparing unknown sound data on the basis of the detected unknown sound, and calculating pattern distances between desired ones of said reference sound sources and said unknown sound source for at least three reference sound source positions on the basis of said unknown sound data and said reference sound data stored in said storage means; and (h) reading out those equi-pattern-distance curves which coincide with said calculated pattern distances and determining a particular mesh point derived from said equi-pattern-distance curves to be the position of the unknown sound source.

2. An unknown sound source evaluating method according to claim 1, wherein said unknown sound data and said reference sound data include commonly at least one of peak values and relative difference in signal arrival times of the sound signals outputted from said sound detectors.

3. An unknown sound source evaluating method according to claim 2, wherein expression representing said pattern distance includes at least one of terms given by $$D^A(A,P) = \left\{ \frac{\mathrm{Var}_j (\ln a_{Aj} - \ln P_j)}{\sqrt{\mathrm{Var}_j (\ln a_{Aj}) \cdot \mathrm{Var}_j (\ln P_j)}} \right\}^{\frac{1}{2}}$$

and $$D^T(A,P) = \left\{ \mathrm{Var}_j (\tau_{Aj} - \tau_{Pj}) \right\}^{\frac{1}{2}}$$

where A represents one of said reference sound source, P represents said unknown sound source, $a_{Aj}$ represents the peak value of said reference sound source A detected by the j-th sound detector, and $P_j$ represents the peak value of said unknown sound source, $\tau_{Aj}$ represents said relative difference in signal arrival time of said reference sound source A detected by the j-th detector, and $\tau_{Pj}$ represents the relative difference in signal arrival time of said unknown sound source.

4. An unknown sound source evaluating method according to claim 1, wherein at said step (h), the mesh point which is located at a minimum squared distance from said equi-pattern-distance curves as read out is determined to be the position of the unknown sound source.

5. An unknown sound source evaluating method according to claim 3, wherein at said step (d), expression representing said equi-pattern-distance curve includes at least one of terms given by $$D_C^A(A,P) = \left\{ \frac{\mathrm{Var}_j (\ln r_{aj} - \ln r_{Pj})}{\sqrt{\mathrm{Var}_j (\ln r_{aj}) \cdot \mathrm{Var}_j (\ln r_{Pj})}} \right\}^{\frac{1}{2}}$$

and $$D_C^T(A,P) = \left\{ \mathrm{Var}_j (r_{aj} - r_{Pj}) \right\}^{\frac{1}{2}},$$

where $r_{aj}$ and $r_{Pj}$ are distances to the j-th detector from the sound sources A and P, respectively.

6. An unknown sound source evaluating method according to claim 5, wherein at said step (e), the expression representing said equi-pattern-distance curve is corrected by modifying respectively $D_C^A(A,P)$ and $D_C^T(A,P)$ as given by $$D_M^A(A,P) = D_C^A(A,P) \cdot \sum_{i=B-I} \frac{M_{A,i}}{R_{P,i}} / \sum_{i=B-I} R_{P,i}$$

and $$D_M^T(A,P) = D_C^T(A,P) \cdot \sum_{i=B-I} \frac{M_{A,i}}{R_{P,i}} / \sum_{i=B-I} R_{P,i},$$

where $R_{P,i}$ represents distance between the mesh point P and the reference sound source position i, and $M_{A,i}$ is determined in accordance with $$M_{A,i} = \frac{D^A(A,i)}{D_C^A(A,i)} = \frac{D^T(A,i)}{D_C^T(A,i)},$$

where i is one of B, C, ..., I.

7. An unknown sound source evaluating method according to claim 1, wherein said reference sounds are generated by said reference sound sources with known kinetic energy at said step (a), while at said step (c), said reference sound data includes data for selecting at least one detector which assures the least variation in the reference sound data for each of said reference sound sources, further including, in succession to said step (h), a step (i) for determining kinetic energy of said unknown sound source on the basis of the reference sound source data derived through the detector which is selected for the reference sound source near the mesh point which has been determined as the unknown sound source position.

8. A method of evaluating kinetic energy of an unknown sound source in a structure, comprising steps of:

(a) producing sequentially reference sounds with known kinetic energy from a plurality of known reference sound source positions in the structure;

(b) detecting said reference sounds produced sequentially by means of at least three sound detectors which are installed, respectively, at predetermined positions of said structure;

(c) preparing reference sound data on the basis of the detected reference sounds information, data of the positions of said reference sound sources and data of the positions of said sound detectors, said reference sound data being stored in storage means, said reference sound data including data for selecting at least one detector which assures the least variation in the reference sound data for each of said reference sound sources;

(d) detecting an unknown sound generated by an unknown sound source in said structure by means of the plurality of said sound detectors;

(e) preparing unknown sound data on the basis of the detected unknown sound, and calculating pattern distances between desired ones of said reference sound sources and said unknown sound source for at least three reference sound source positions on the basis of said unknown sound data and said reference sound data stored in said storage means;

(f) determining the position of said unknown sound source on the basis of said calculated pattern distances; and (g) determining kinetic energy of said unknown sound source on the basis of the reference sound data derived through the detector which is selected for the reference sound source near the unknown sound source position.

9. An apparatus for evaluating position of an unknown sound source in a structure, comprising:

at least three sound detectors mounted on said structure at respective predetermined positions for detecting reference sounds generated at known reference sound source positions and an unknown sound produced by an unknown sound source;

waveform signal storing means for recording detection signals outputted from said sound detectors;

storage means for storing at least data concerning said reference sound sources in the form of sound data;

a computer connected to said waveform storing means and said sound data storing means to prepare reference sound data from the waveform signals of the reference sound sources stored in said waveform signal storing means said reference sound data prepared being stored in said sound data storing means, said computer computing, on the basis of the reference sound data, equi-pattern-distance curves each of which is in an equal pattern distance between a supposed unknown sound source and each of said reference sound sources, and further said computer correcting the equi-pattern-distance curves on the basis of the pattern distances actually measured between the reference sound source associated with said equi-pattern-distance curve and at least one of the other reference sound sources, said computer being operative, upon occurrence of an unknown sound, to prepare unknown sound data on the basis of the waveform signal of the unknown sound source recorded in said waveform signal storing means and arithmetically determine pattern distances between desired ones of said reference sound sources and said unknown sound source for at least three reference sound source positions on the basis of said reference sound data and said unknown sound data, to thereby determine the position of said unknown sound source on the basis of said arithmetically determined pattern distances and the corrected equi-pattern-distance curves; and display means for displaying information including the position of said unknown sound source determined by said computer.

* * * * *